United States Patent
Harbaugh

(10) Patent No.: US 8,667,735 B2
(45) Date of Patent: Mar. 11, 2014

(54) MOLDED PLANTER WITH WIDE UPPER RIM

(75) Inventor: Kenneth A. Harbaugh, Destin, FL (US)

(73) Assignee: ATT Southern, Inc., Atlanta, GA (US)

( * ) Notice: Subject to any disclaimer, the term of this patent is extended or adjusted under 35 U.S.C. 154(b) by 279 days.

(21) Appl. No.: 13/221,500

(22) Filed: Aug. 30, 2011

(65) Prior Publication Data

US 2012/0060415 A1   Mar. 15, 2012

Related U.S. Application Data

(60) Provisional application No. 61/378,028, filed on Aug. 30, 2010.

(51) Int. Cl.
*A01G 9/02*   (2006.01)
(52) U.S. Cl.
USPC ............................................................. 47/66.1
(58) Field of Classification Search
USPC ........... 47/66.1, 65.5; 119/61.5, 61.54, 61.55; 220/574
See application file for complete search history.

(56) References Cited

U.S. PATENT DOCUMENTS

| | | | | |
|---|---|---|---|---|
| 3,307,602 A | * | 3/1967 | Boster | 220/254.7 |
| 4,706,833 A | * | 11/1987 | Korcz et al. | 220/613 |
| 4,747,511 A | * | 5/1988 | Dutt et al. | 220/254.2 |
| 4,771,911 A | * | 9/1988 | Morony et al. | 220/592.16 |
| 4,791,754 A | * | 12/1988 | Demars, Jr. | 47/29.2 |
| 6,360,484 B1 | | 3/2002 | Kreizel | |
| D586,620 S | * | 2/2009 | Sands | D7/507 |
| 7,886,484 B1 | * | 2/2011 | Chen | 47/65.5 |
| 2007/0089364 A1 | | 4/2007 | Rice | |
| 2007/0199512 A1 | * | 8/2007 | Ellis | 119/61.54 |

* cited by examiner

*Primary Examiner* — Kimberly Berona
*Assistant Examiner* — Ebony Evans
(74) *Attorney, Agent, or Firm* — Eckert Seamans Cherin & Mellott, LLC; David C. Jenkins

(57) ABSTRACT

A planter includes a concave container and a separate rim, both formed from a thermoplastic material. The container has a brim extending radially outward from an upper portion of the container. A vertical wall extends upward from the brim and has exterior flanges and grooves formed on its outer surface. The rim has a top wall with outer and inner side walls extending downward from its edges. Interior flanges and grooves formed on the inner surface of the outer rim wall are configured to engage the exterior flanges and grooves on the outer surface of the container vertical wall such that the rim can be secured onto the upper end of the container. The upper surface of the brim of the container comprises a stop inward of the vertical wall such that when the rim is advanced onto the upper end of the container, a lower portion of the inner rim wall confronts the stop to inhibit further advancement.

6 Claims, 15 Drawing Sheets

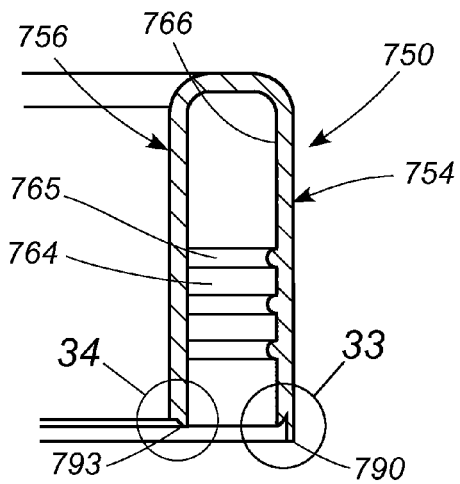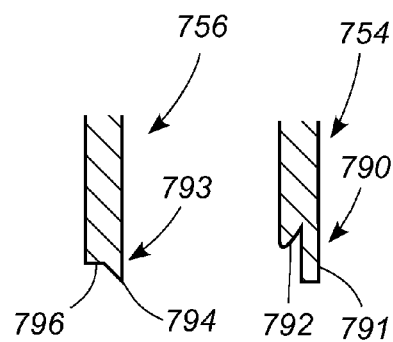
*Fig. 32*  *Fig. 34*  *Fig. 33*
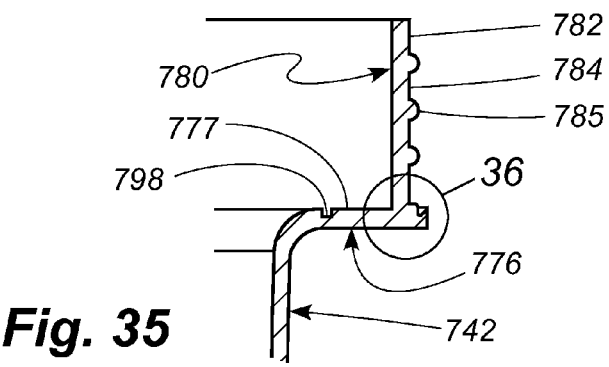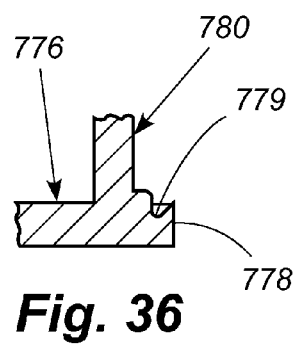
*Fig. 35*  *Fig. 36*
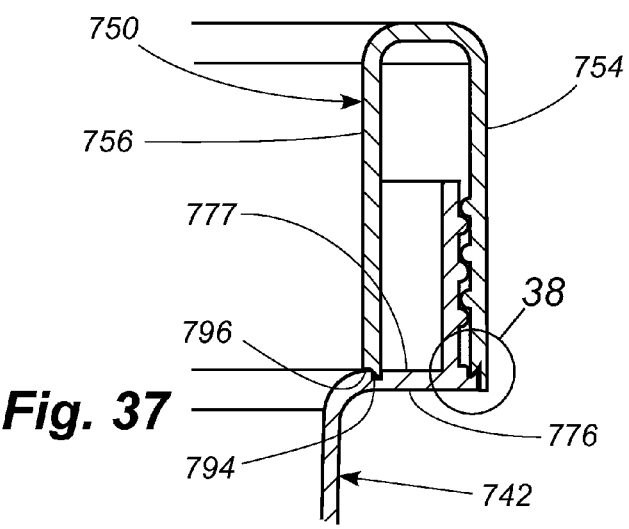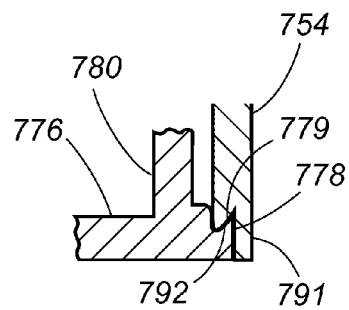
*Fig. 37*  *Fig. 38*

MOLDED PLANTER WITH WIDE UPPER RIM

CROSS-REFERENCE TO RELATED APPLICATION

This application claims priority of U.S. provisional patent application 61/378,028, filed Aug. 30, 2010, and incorporated herein by reference.

TECHNICAL FIELD

The present invention relates generally to planters and relates more specifically to a molded planter having a wide upper rim.

BACKGROUND OF THE INVENTION

A conventional pottery planter is shown in FIGS. 1 and 2. The pottery planters 10 often comprise a wide, thick peripheral rim 12 at the upper edge of the planter. The wide rim has a pleasing appearance and provides a comfortable grip for lifting and moving the planter. The interior 14 of the rim of the pottery planter is solid, that is, the rim is filled with the clay material.

Planters formed of thermoplastic material provide advantages over pottery planters. A plastic planter is lighter, easier to handle, and less expensive to manufacture. Plastic planters can be produced in various colors and surface finishes more easily than a comparable ceramic planter.

But problems arise when trying to replicate the design of FIGS. 1 and 2 with plastic material. The mass of a thick rim of solid plastic makes cooling problematic—after the rest of the plastic material has cooled, the rim is still hot and can sag or deform before it solidifies. But the plastic within the solid rim is not necessary either structurally or aesthetically, and costs can be reduced if the amount of material needed to form the planter is reduced.

One way of addressing these issues would be to make the rim hollow. U.S. Pat. No. 6,383,440 to Chen discloses a one-piece plastic container with an integral hollow rim. As shown in FIG. 8 of Chen, the container 72 includes integral rim walls 74, 75 defining a hollow space 76. However, the container disclosed in Chen requires a complex manufacturing process involving expensive equipment comprising a series of active and passive dies and the blowing of air into a die chamber to form the hollow space within the rim.

SUMMARY OF THE INVENTION

Stated generally, the present invention comprises a planter including a concave container and a separate rim, both formed from a thermoplastic material. The container has a brim extending radially outward from an upper portion of the container, and a vertical wall extends upward from the brim. The rim has a top wall with outer and inner side walls extending downward from its edges. Interior flanges and grooves formed on the inner surface of the outer rim wall are configured to engage the exterior flanges and grooves on the outer surface of the container vertical wall such that the rim can be screwed onto the upper end of the container. A channel is formed in the upper surface of the brim of the container inward of the vertical wall such that when the rim is screwed onto the upper end of the container, a lower portion of the inner rim wall engages the channel.

In one embodiment the container brim has an outer edge, and the rim is configured such that when the rim is screwed onto the upper end of the container, a lower portion of the outer rim wall extends over the outer edge of the planter brim to present a seamless appearance.

In another aspect the disclosed embodiment has an inner stop formed on a lower portion of the inner rim wall and configured such that when the rim is screwed onto the upper end of the container, the inner stop confronts the upper surface of the container brim to prevent the rim from being overtightened.

In still another aspect the disclosed embodiment has an outer stop formed on a lower portion of the outer rim wall and configured such that when the rim is screwed onto the upper end of the container, the outer stop confronts the upper surface of the container brim to prevent the rim from being overtightened.

Objects, features, and advantages of disclosed embodiments of the invention will become apparent upon reading the following specification, when taken in conjunction with the drawings and the appended claims.

BRIEF DESCRIPTION OF THE DRAWINGS

FIG. 32 is a cross section of a rim of still another embodiment of a planter.

FIG. 33 is an enlarged cross section of the portion of the rim indicated by the circle 33 in FIG. 32.

FIG. 34 is an enlarged cross section of the portion of the rim indicated by the circle 34 in FIG. 32.

FIG. 35 is a partial cross section of the upper portion of a container for use with the rim of FIG. 32.

FIG. 36 is an enlarged cross section of the portion of the container indicated by the circle 36 in FIG. 35.

FIG. 37 is a cross section of the rim of FIG. 32 assembled onto the container upper portion of FIG. 35.

FIG. 38 is an enlarged cross section of the assembled rim and container indicated by the circle 38 in FIG. 37.

DETAILED DESCRIPTION OF THE DISCLOSED EMBODIMENT

Reference is now made to the drawings, in which like numerals indicate like elements throughout the several views.

Figure 1:
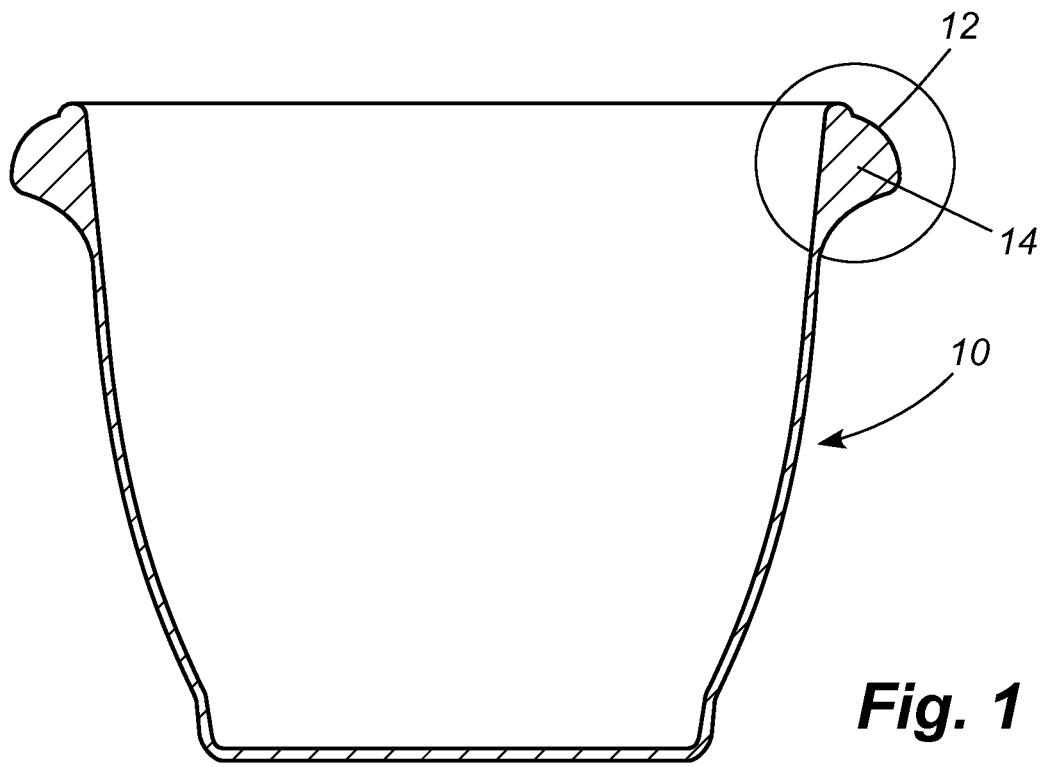
FIG. 1 is a cross-section of a PRIOR ART pottery planter.
Figure 2:
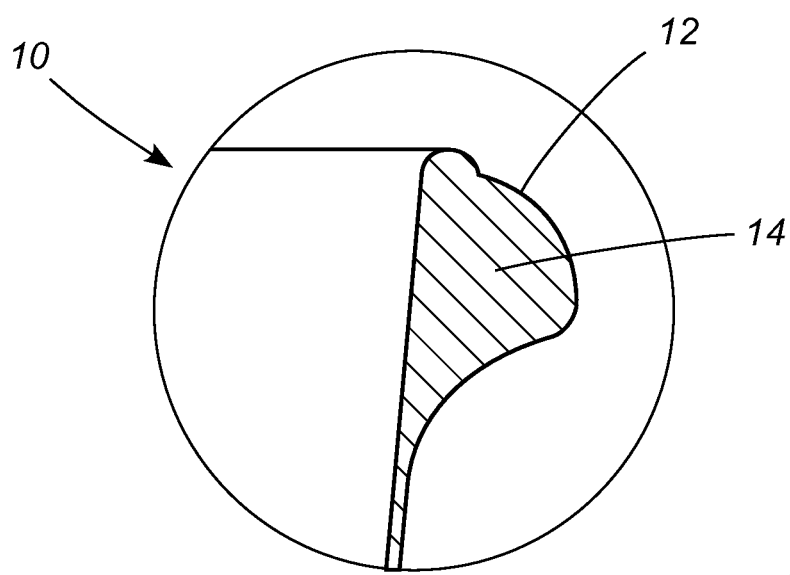
FIG. 2 is an enlarged view of the portion of the PRIOR ART pottery planter identified by the circle 2 in FIG. 1.
Figure 3:
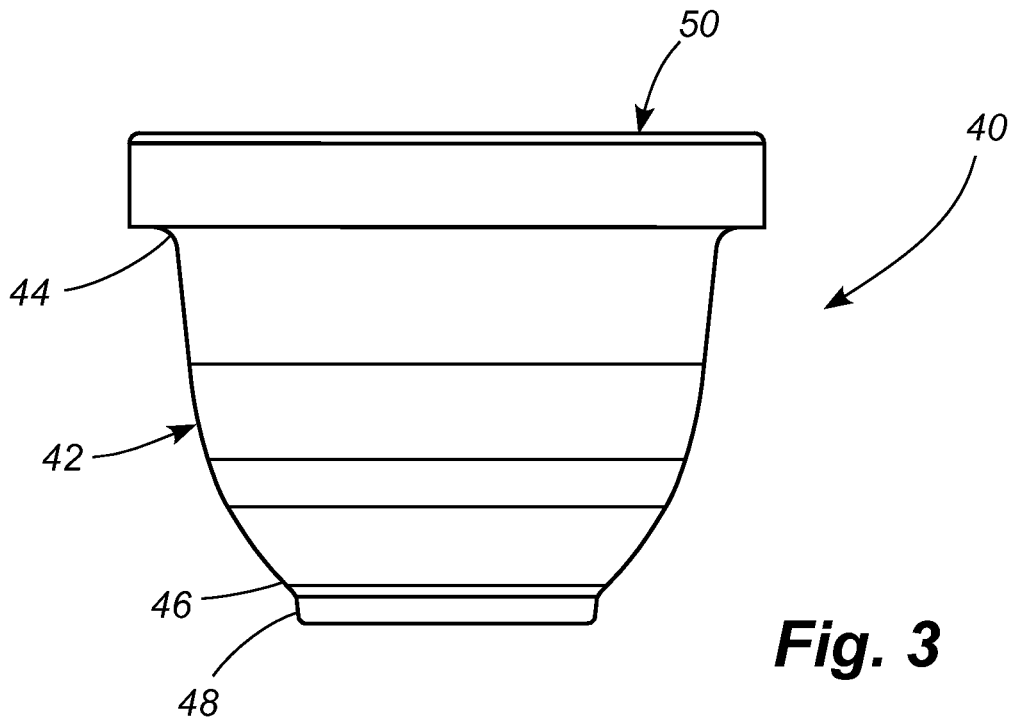
FIG. 3 is a side view of a first embodiment of a molded thermoplastic planter with wide upper rim.
Figure 4:
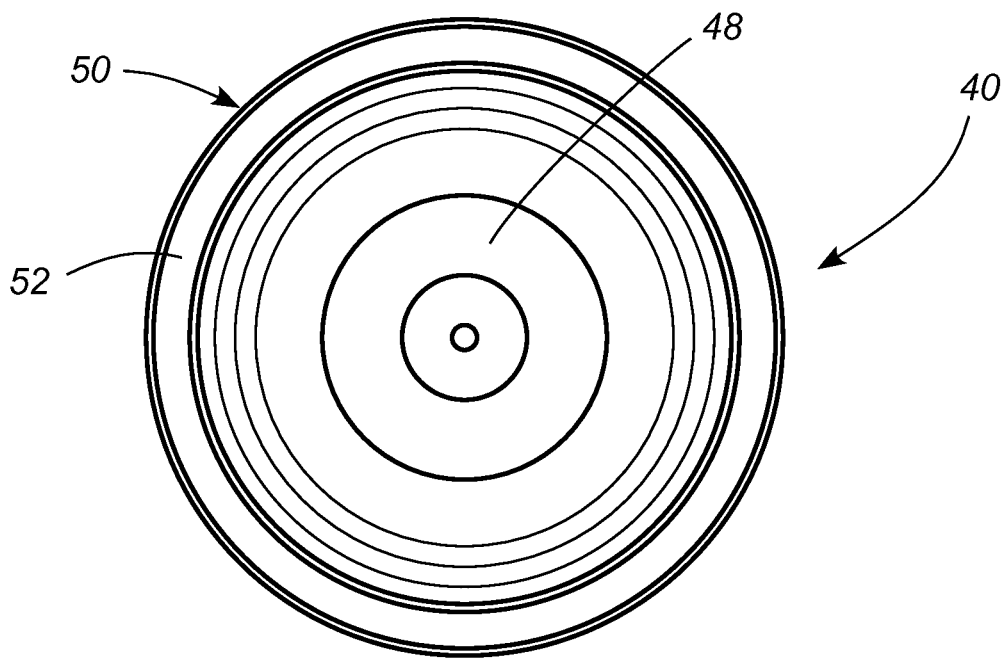
FIG. 4 is a top view of the molded planter of FIG. 3.
Figure 5:
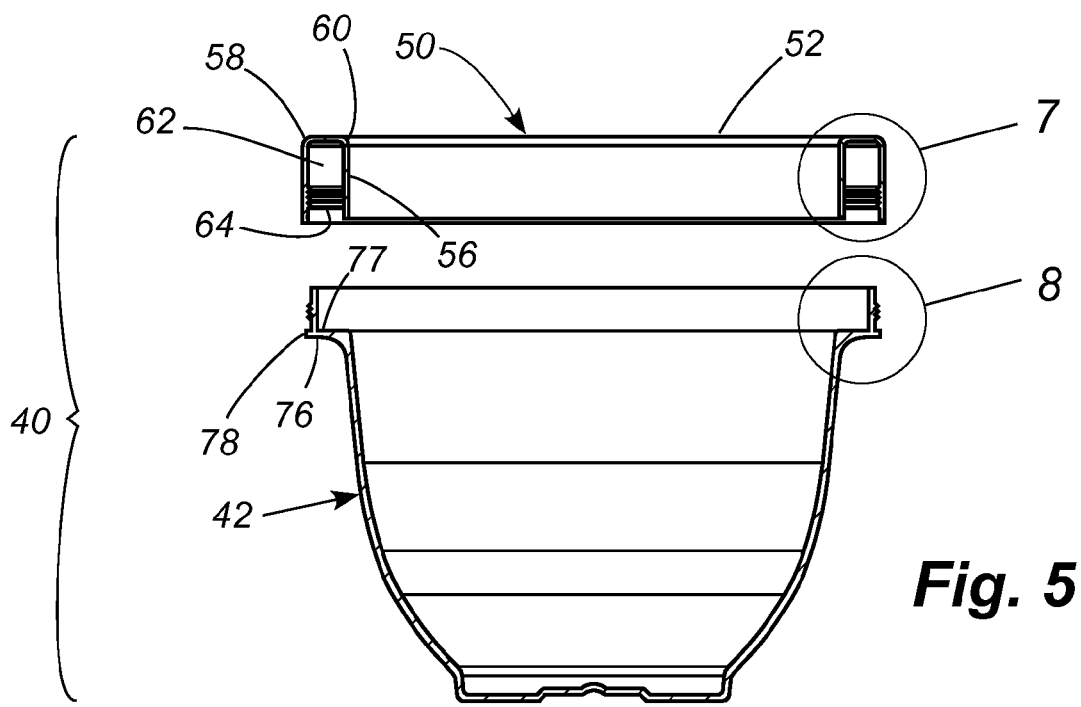
FIG. 5 is a section view of the planter of FIG. 3 with the rim exploded away from the container.
Figure 6:
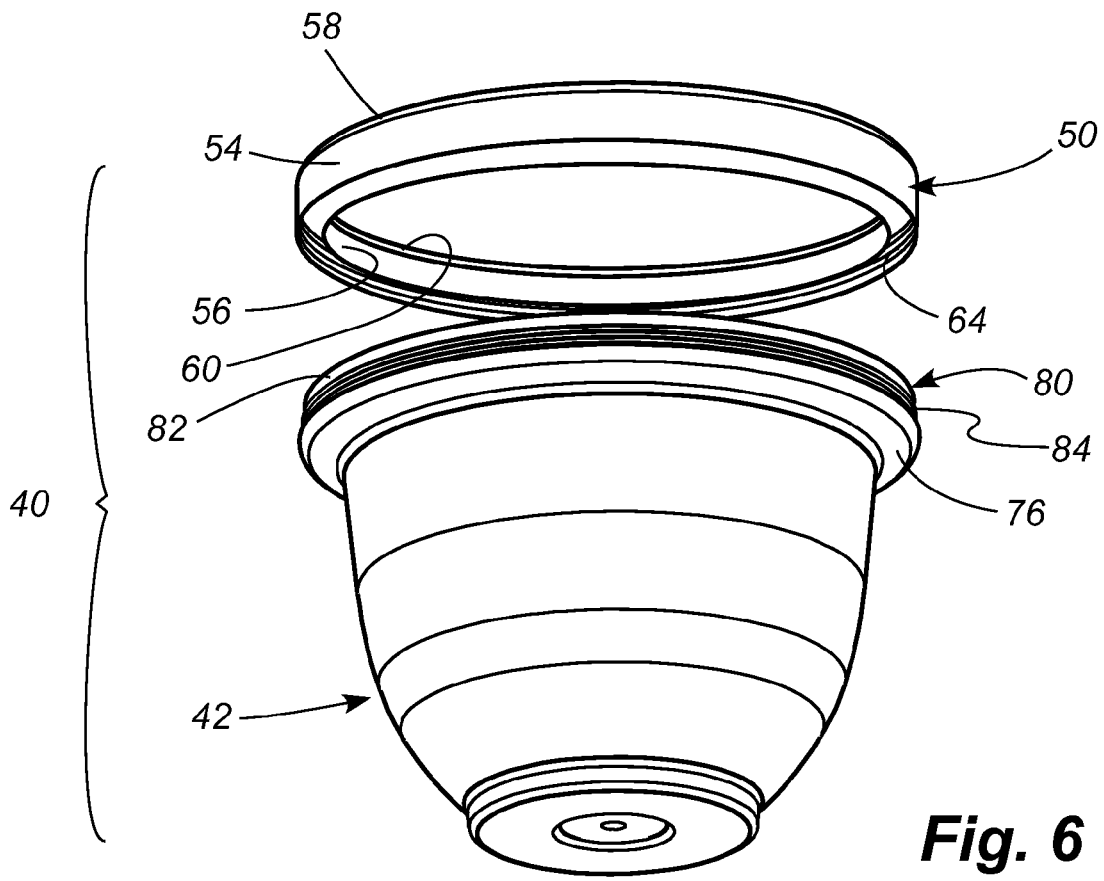
FIG. 6 is an orthogonal view of the rim and planter of FIG. 5.
Figure 7:
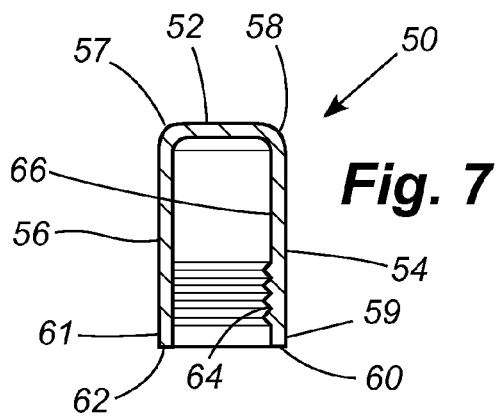
FIG. 7 is an enlarged cross-sectional view of the portion of the rim circumscribed by the circle 7 in FIG. 5.

FIGS. 3 and 4 illustrate a first embodiment of a planter 40. The planter 40 includes a container 42 having an upper end 44 and a lower end 46. A base 48 is located at the container's lower end 46. At an upper portion of the container adjacent the upper end 44 of the container 42 is an annular rim 50. The rim 50 has a top wall 52.

Referring now to FIGS. 5-9, the rim 50 includes outer and inner rim walls 54, 56 extending downward from the outer and inner edges 58, 60 of the top rim wall 52. The outer and inner edges 58, 60 of the top wall 52 of the rim 50 can optionally be beveled, rounded, squared, or otherwise aesthetically shaped. The outer rim wall 54 has an inwardly facing surface 66. Serrations 64 are formed on the inwardly facing surface of the outer rim wall 54.

A brim 76 extends outward from an upper portion of the container 42. The brim 76 has an upper surface 77 and an outer circumferential edge 78. A vertical upper container wall 80 extends upward from the brim 76 at a location proximate the outer circumferential edge 78 of the brim. The vertical upper container wall 80 terminates at an upper edge 81. The vertical upper container wall 80 has an outward facing surface 82 with serrations 84 formed thereon.

Figure 9:
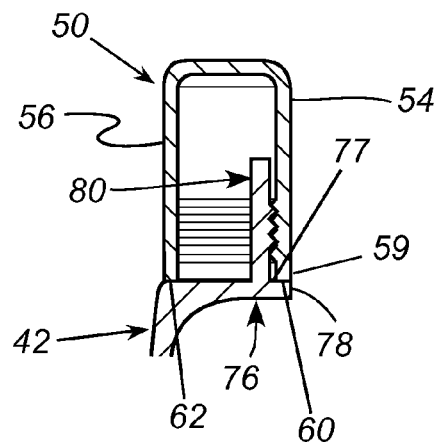
FIG. 9 is an enlarged partial cross section of the rim of FIG. 7 assembled onto the container of FIG. 8.

FIG. 9 shows the rim 50 mounted onto the upper end of the container 42. The inner surface 66 of the outer wall 54 of the rim 50 and the outer surface 81 of the vertical wall 80 of the container 42 are in mutually facing relation. The serrations 84 on the outer surface 81 of the vertical wall 80 of the container 42 cooperatively engage the serrations 64 on the inner surface 66 of the outer rim wall 54 to couple the rim 50 to the upper end of the container 42.

Also in FIG. 9, the lower edge 60 of the outer wall 54 of the rim 50 confronts the upper surface 77 of the brim 76 of the container to prevent overtightening. Similarly the lower edge 62 of the inner wall 56 of the rim 50 confronts the upper surface 77 of the brim 76 of the container to prevent overtightening.

It will be appreciated that it is unnecessary for both the lower edge 60 of the outer wall 54 and the lower edge 62 of the inner wall 56 of the rim to confront the brim 76 of the container to prevent overtightening. Engagement of the brim by the lower edge of either wall will prevent further tightening.

Figure 10:
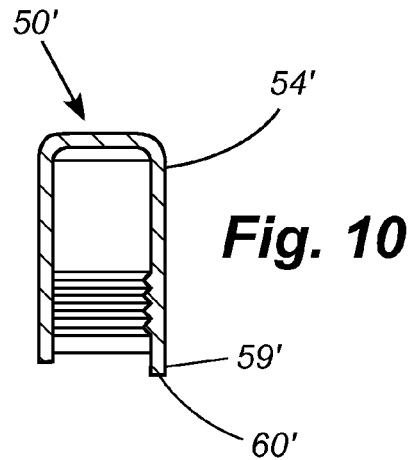
FIG. 10 is an enlarged partial cross section of a second embodiment of a rim.
Figure 8:
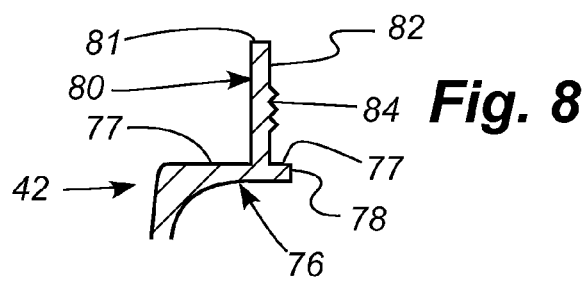
FIG. 8 is an enlarged cross-sectional view of the portion of the container circumscribed by the circle 8 in FIG. 5.
Figure 11:
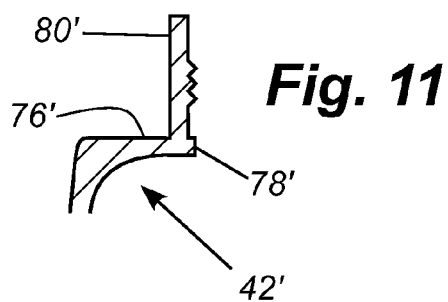
FIG. 11 is an enlarged partial cross section of the upper portion of a second embodiment of a container.
Figure 12:
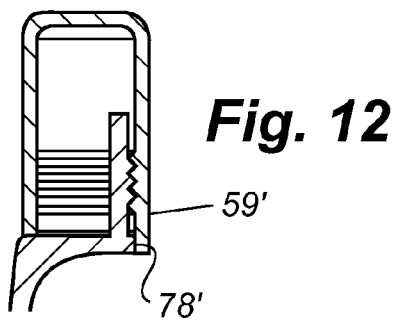
FIG. 12 is an enlarged partial cross section of the rim of FIG. 10 assembled onto the container of FIG. 11.

FIGS. 10-12 illustrate a second embodiment of a container and rim. All parts are identical to those previously described with respect to FIGS. 7-9 with the exception of those reference numbers followed by the "prime" symbol (e.g., 57'). In FIGS. 10-12, the lower portion 59' of the outer wall 54' extends lower than in the previous example, and the portion of the brim 76' outward of the vertical wall 80' does not extend as far outward. Consequently when the rim 50' is assembled onto the upper end of the container 42', the lower portion 59' of the outer wall 54' extends over the outer edge 78' of the brim 76' to conceal it from view, thereby providing a seamless appearance.

Figure 13:
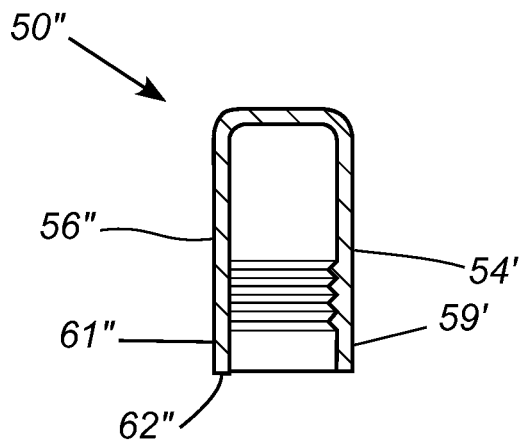
FIG. 13 is an enlarged partial cross section of a third embodiment of a rim.
Figure 14:
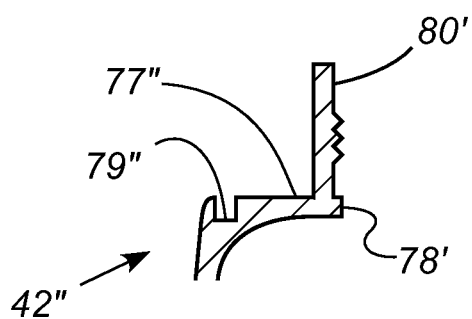
FIG. 14 is an enlarged cross section of a third embodiment of a container for use with the rim of FIG. 13.
Figure 15:
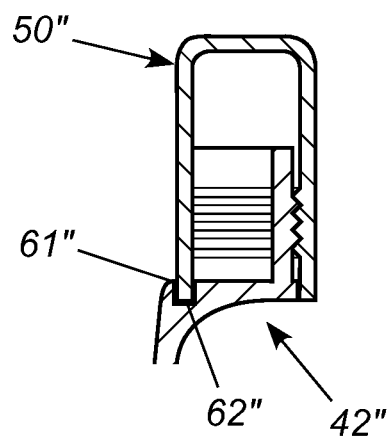
FIG. 15 an enlarged cross section of the rim of FIG. 13 assembled onto the container of FIG. 14.
Figure 16:
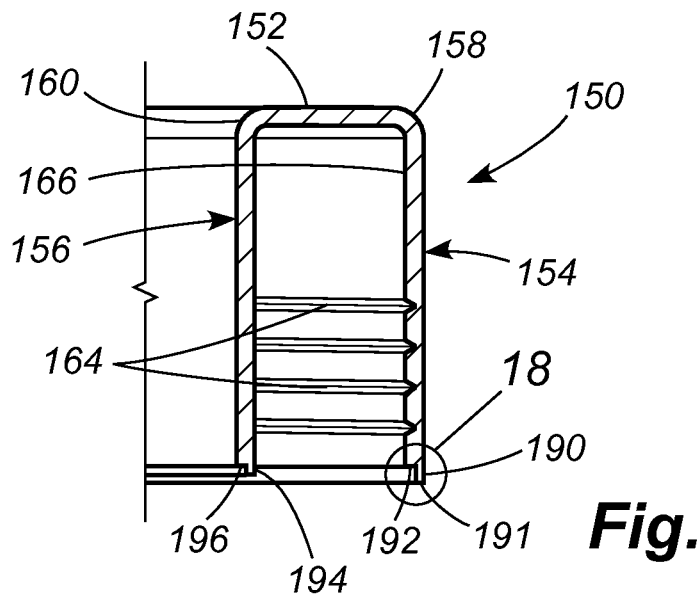
FIG. 16 is an enlarged partial cross section of a fourth embodiment of a rim.

FIGS. 13-15 illustrate another embodiment of a container and rim. All parts are identical to those previously described with respect to FIGS. 7-9 and 10-12 with the exception of those reference numbers followed by the "double prime" symbol (e.g., 57").

The outer wall 64' of the rim 50" and the vertical wall 80' of the container 42" are substantially identical to their counterparts in FIGS. 10-12. However, the lower portion 61" of the inner leg 56" is longer than in the previous embodiments, and a channel 79" is formed in the upper surface 77" of the brim 76" of the container 42". When the rim 50" is attached to the upper end of the container 42", the lower portion 61" of the inner rim wall 56" engages the channel 98". This engagement prevents lateral movement of the rim and inhibits accidental disengagement of the two components. Further, the lower edge 62" of the rim 50" confronts the bottom of the channel 98" to prevent accidental overtightening.

Figure 17:
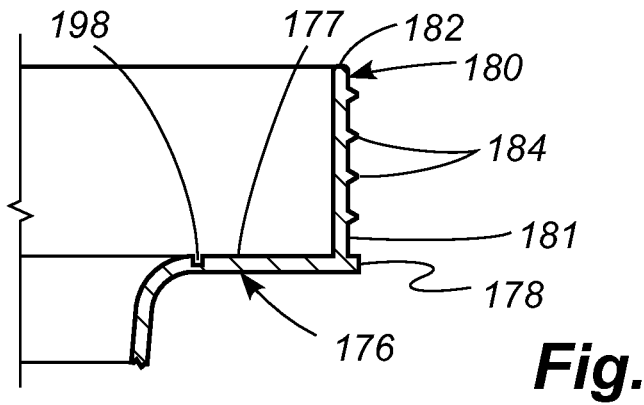
FIG. 17 is an enlarged cross section of a fourth embodiment of a container for use with the rim of FIG. 16.
Figure 18:
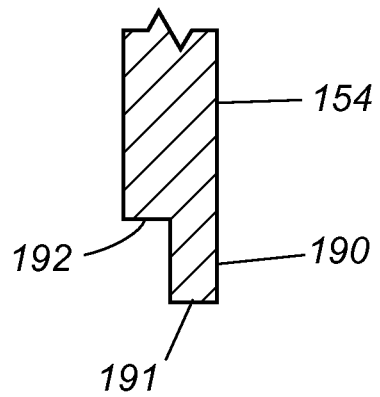
FIG. 18 is an enlarged cross-sectional view of the portion of the rim circumscribed by the circle 18 in FIG. 16.
Figure 19:
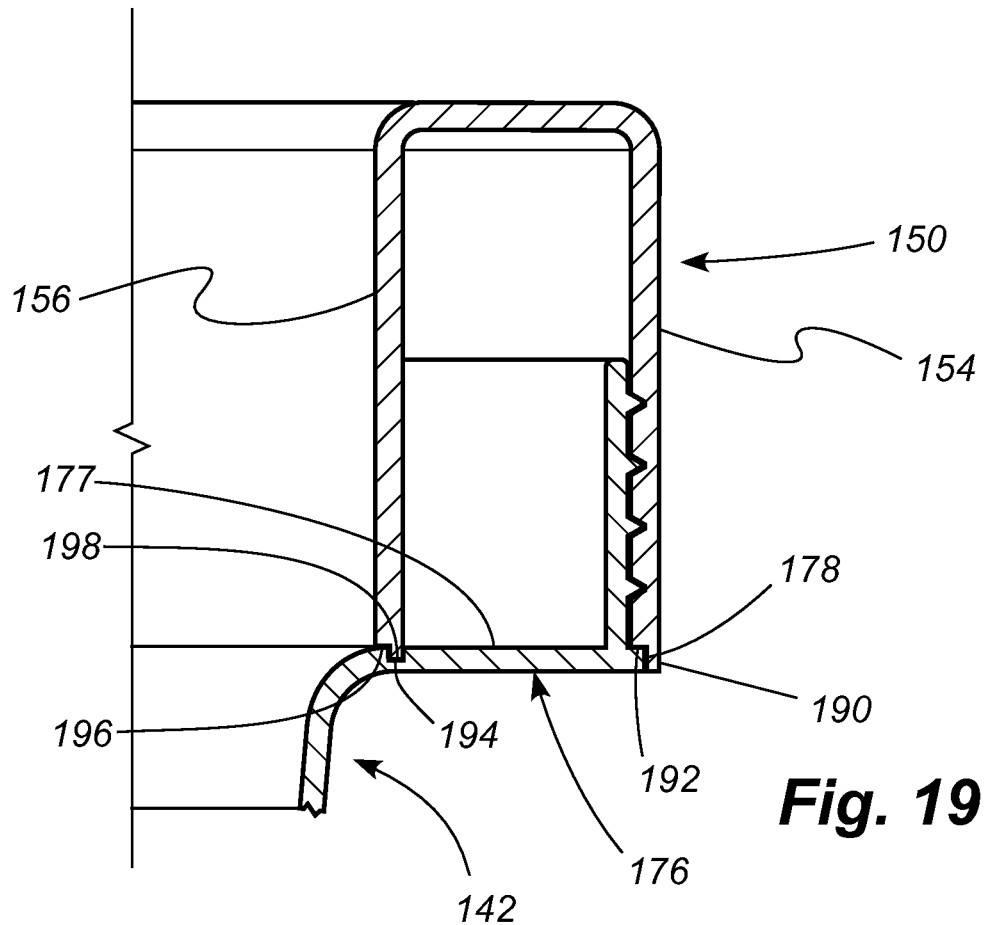
FIG. 19 is a partial cross section of a fifth embodiment of a rim and container.

Referring to FIGS. 16-19, the lower end 190 of the outer rim wall 154 comprises a portion 191 of reduced cross section in comparison to the width of the major portion of the outer rim wall. As seen in FIG. 18, a transition 192 is formed between the major portion of the outer rim wall and the portion 191 of reduced cross section. In the embodiment 150 the portion 91 is about half of the width of the major portion of the outer rim wall 154. The length of the portion 191 of reduced cross section is approximately equal to or longer than the width of the outer edge 178 of the brim 76 of the container 42.

Referring again to FIG. 16, the lower end of the inner rim wall 156 comprises a lip 194 consisting of a section of the inner wall 156 having a reduced cross section. At the upper end of the lip 194 an inner stop 196 is formed at the transition between the lip and the major portion of the inner wall 156.

Referring to FIG. 17 a channel 198 is formed in the upper surface 177 of the container brim 176 at a location spaced inward from the vertical wall 180. The width of the channel 198 is configured to receive the downward extending lip 194 at the lower end of the inner vertical wall 156 of the rim 50.

As used herein, the term "serrated" or "serrations" refers to a surface having a series of peaks and troughs where the distance between adjacent peaks is approximately equal to the distance between adjacent troughs. In the embodiment of FIGS. 16-19, the mutually facing walls of the rim and container are not serrated. Instead, in the embodiment of FIGS. 16-18, a series of flanges 184 is formed on the outward facing surface 181 of the vertical wall 180 of the container. A series of corresponding grooves 164 is formed on the inward facing surface 166 of the outer rim wall 154. By comparison to serrations, the flanges 184 have peaks that are much farther apart than the distance between adjacent troughs, while the grooves 164 have troughs that are much farther apart than adjacent peaks.

Unless specifically stated otherwise in the claims, both "serrations" and cooperating "flanges and grooves" as used in the specification will be understood to refer to an arrangement in which at least one flange is located on either the inward facing surface 166 of the outer rim wall 154 or the outward facing surface 181 of the vertical wall 180 of the container, and a corresponding groove is formed on the other.

Figure 20:
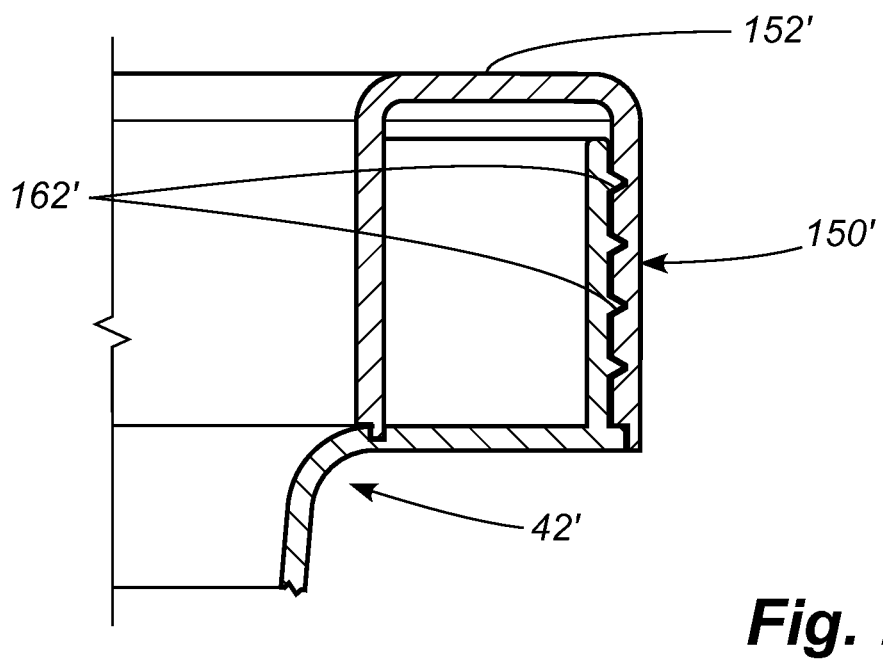
FIG. 20 is a partial cross section of a sixth embodiment of a rim and container.

FIG. 20 shows an alternate embodiment of a rim 150' that has a lower profile than the rim 50 previously disclosed. The portion of the rim 150' below the upper end of the flanges and grooves is the same as the rim 50. But the portion of the rim 150' between the upper end of the flanges and grooves and the upper wall 152' of the rim has been shortened to reduce the profile of the rim. The rim 150' can fit onto the same container 42 as the rim 50 previously described. Thus the profile of the planter can be changed while using the same container 42.

Figure 21:
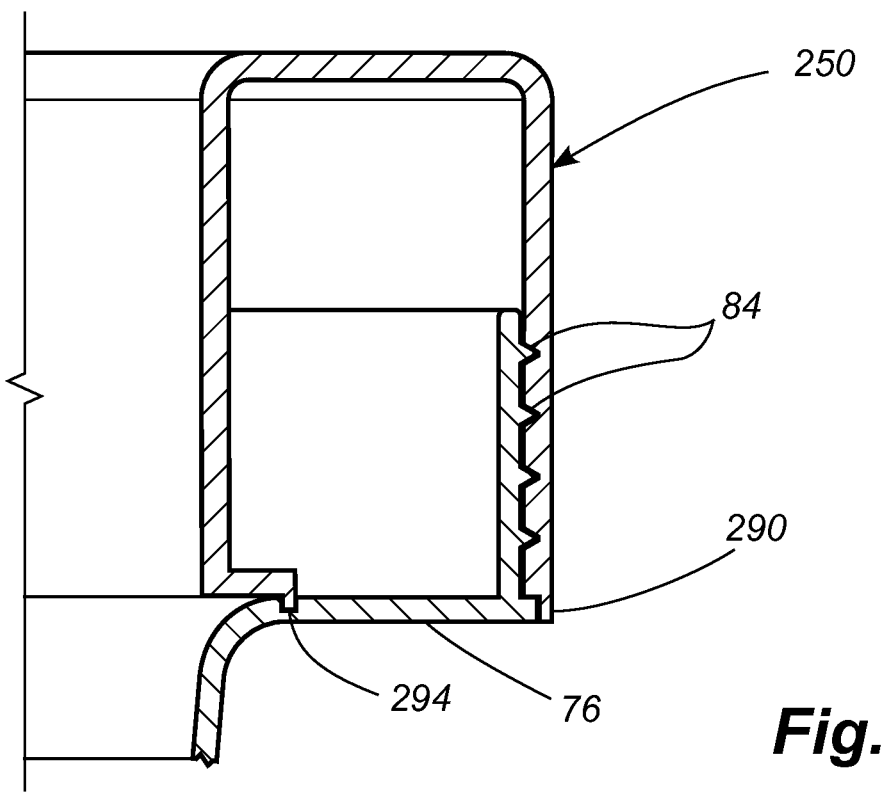
FIG. 21 is a partial cross section of a seventh embodiment of a rim and container.
Figure 22:
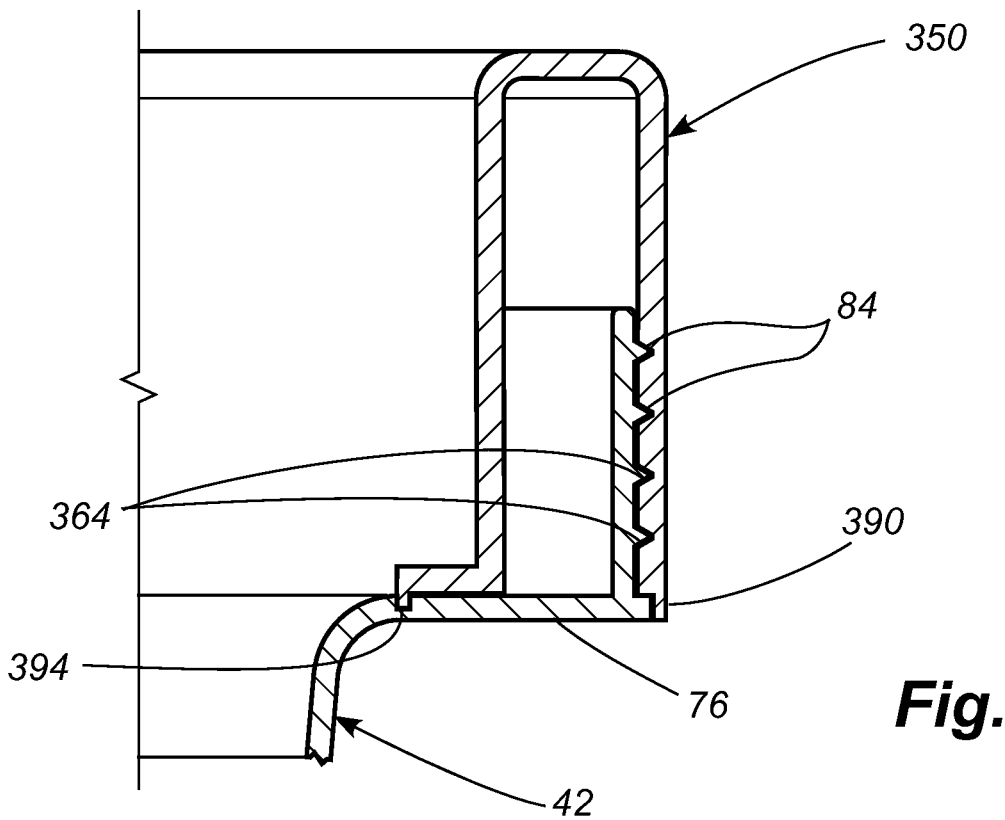
FIG. 22 is a partial cross section of an eighth embodiment of a rim and container.

FIGS. 21 and 22 show further alternate embodiments of rims 250, 350 that have wider or narrower profiles than the rim 50. So long as the interior flanges and grooves 264, 364, portions 291, 294, 391, and 394 of reduced cross section are properly positioned to engage the brim 76 and the exterior flanges and grooves 84 at the upper end of the container 42 (container elements shown in, e.g., FIGS. 5 and 6), rims of various configurations can be used to change the appearance of the planter while maintaining the same container configuration. The interchangeability of the rims reduces cost, in that only a single container configuration need be manufactured and stocked.

Figure 23:
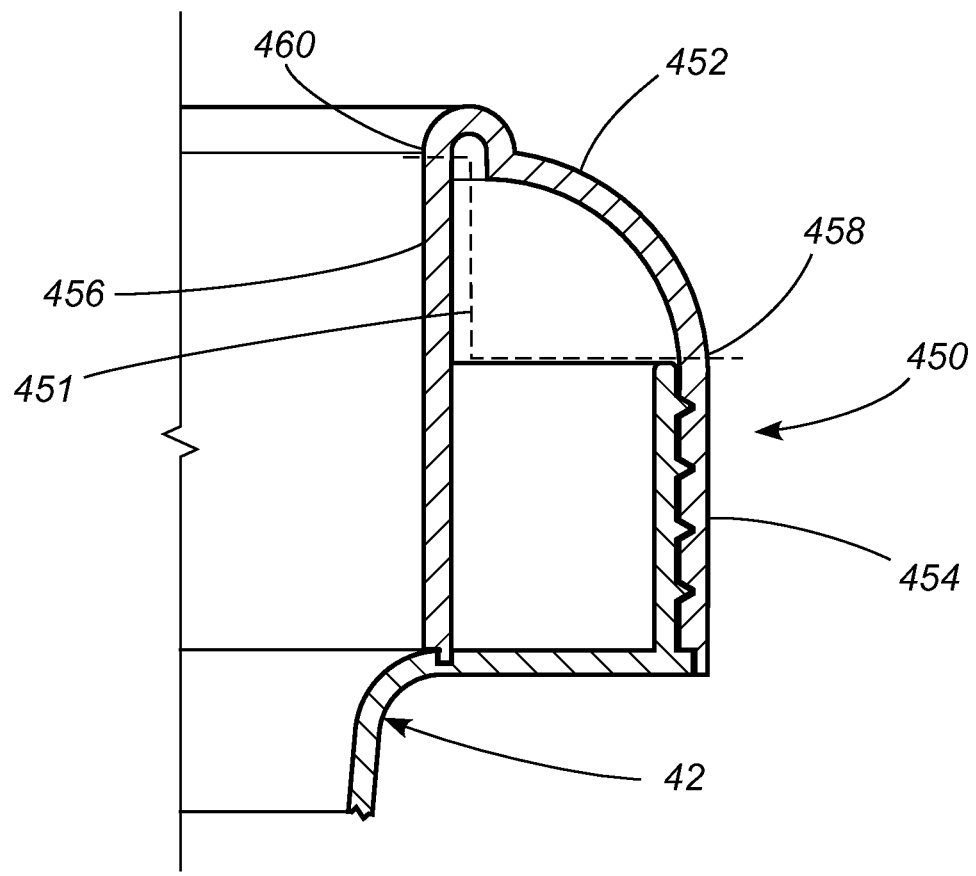
FIG. 23 is a partial cross section of a ninth embodiment of a rim and container.

FIG. 23 shows still another embodiment of a rim 450, in which the upper portion of the rim is contoured. In this example, the portion of the rim 450 above the dashed line 451 is considered the top rim wall 452. The outer and inner rim walls 454, 456 extend downward from the outer and inner edges 458, 460 of the top rim wall 452. Once again this embodiment of the rim 450 can be used with the container 42 without modification.

Similarly, rims having decorative molding, for example on the outer surface of the outer wall, can be provided to vary the appearance of the planter while using the same container 42.

In the embodiments described above, the serrations or the flanges and grooves can be configured as mating helical threads on the upper wall of the container and the inner surface of the outer wall of the rim. The rim can thus be screwed on to the upper end of the container.

As an alternate arrangement of fastening the rim to the upper portion of the container, the outer wall of the container and the inner surface of the rim outer wall can be equipped with a series of cooperating parallel, rather than helical, flanges and grooves. To assemble the rim onto the container, the rim is forced downward over the upper end of the container. As the rim is forced downward, the walls flex such that the parallel grooves on the rim and the container are forced past one another. When the rim had been fully advanced, as limited by engagement of the stop against the upper surface of the brim, the parallel grooves on the inner surface of the rim outer wall engage the parallel, mating grooves on the outer wall of the container to maintain the rim and container in fixed relation.

A hybrid of these two processes is also possible. With the rim and container provided with helical grooves and flanges, the assembler can push the rim down over the top of the container. The walls yield to allow the flanges to snap past the grooves to achieve the initial assembly. From that point the assembler can screw the rim the rest of the way down onto the container.

Figure 24:
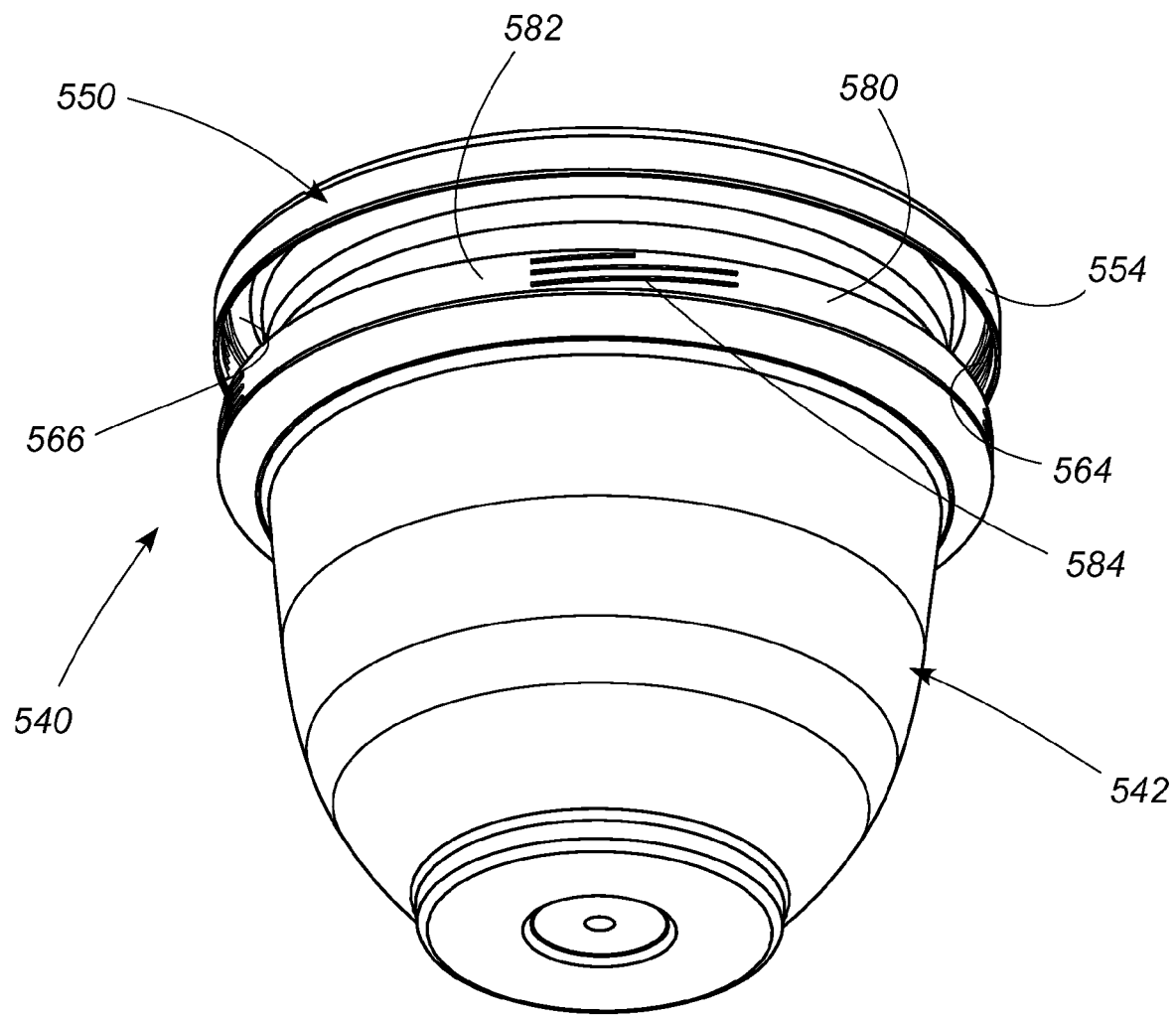
FIG. 24 is a bottom orthogonal view of a tenth embodiment of a rim and container.

To facilitate the manufacturing process, either the rim or the container can be provided with grooves around only a portion of its periphery. Referring to FIG. 24, a planter 540 includes a container 542 and a rim 550. The rim 550 has an outer wall 554 with parallel grooves 564 formed on its inner surface 566. The container 542 has an upper wall 580 having an outer surface 582. Spaced-apart series of parallel flanges and grooves 584 are located around the periphery of the upper wall 580. As an example, there may be four series of flanges and grooves 584, each of which extend around 45° of the wall 580. However, this is just an example and is not intended to be limiting. There may be a smaller or larger number of series of flanges and grooves 584 spaced around the periphery of the wall 580. The series of grooves may extend more or less than 45°. There is no need that the series of grooves 584 be equally spaced around the periphery of the upper wall 580. The only limiting factor is that there be enough grooves on the outer wall 584 of the upper wall 580 to mate with the grooves 564 on the rim 550 to hold the rim in place regardless of the angular orientation of the rim with respect to the container 542.

Conversely, the container 542 may have grooves that extend 360° around the upper wall 580, and the inner surface 566 of the outer wall 554 of the rim 550 may have interrupted series of parallel grooves 564 that mate with the continuous grooves 584 on the upper wall 580 of the container 542.

As still another variant, the container 542 and rim 550 might both have interrupted series of grooves 564, 584. In this instance it would be advantageous that there be a greater percentage of grooved circumference than intervening spaces between the grooves so that it is not possible to place the rim on the container without there being engagement between the container's grooves and the rim's grooves. Stated differently, it is preferable that there be no rotational orientation between the rim and the container in which, because of location or length of the grooves, none of the container's grooves engage any of the rim's grooves.

Figure 25:
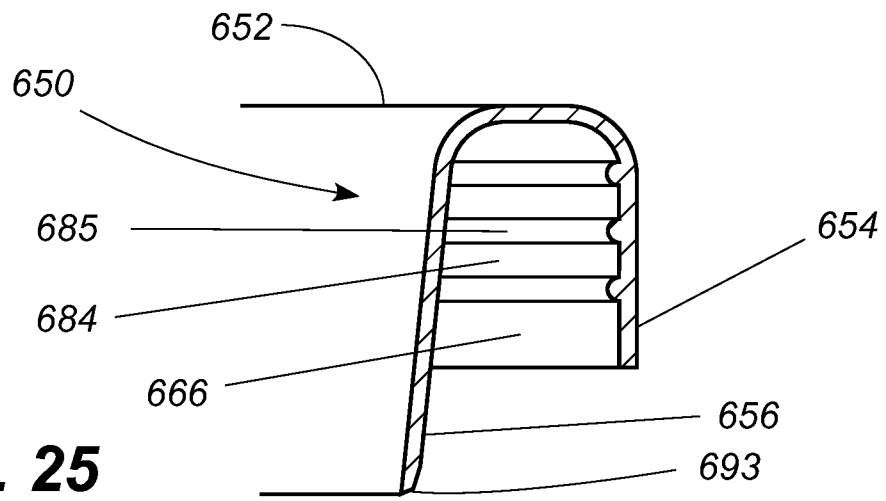
FIG. 25 is a partial cross section of an eleventh embodiment of a rim.

Referring now to FIG. 25, a rim 650 has an upper rim wall 652, an outer rim wall 654, and an inner rim wall 656. The inner surface of the outer rim wall 654 includes alternating grooves 684 and flanges 685. The lower end 693 of the inner rim wall 656 is optionally beveled.

Figure 26:
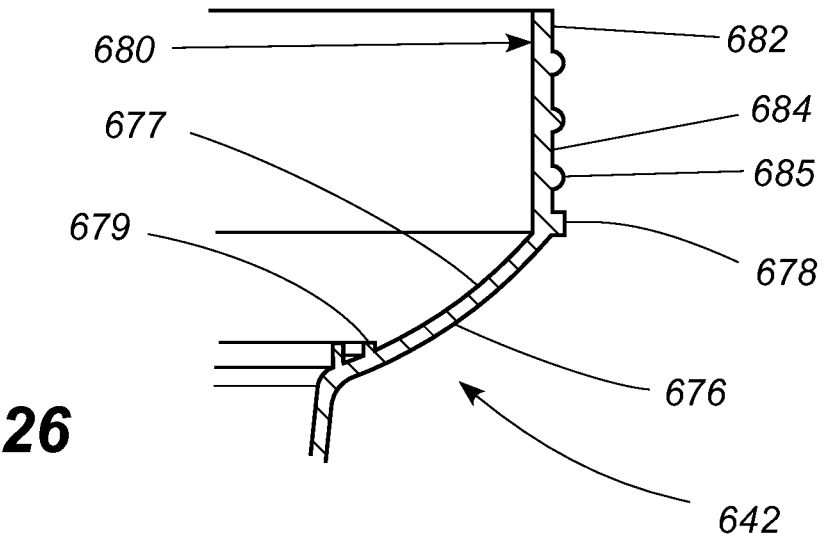
FIG. 26 is a partial cross section of a container for use with the rim of FIG. 25.

FIG. 26 shows the upper end of a container 642. The container 642 includes a brim 676 having an upper surface 677 and an outer edge 678. A tab 679 extends upward from the upper surface 677 of the brim 676.

A vertical wall 680 extends upward from the brim 676. The vertical wall 680 has an outer surface 682. Alternating grooves 684 and flanges 685 are formed on the outer surface 682 of the vertical wall 680.

Figure 27:
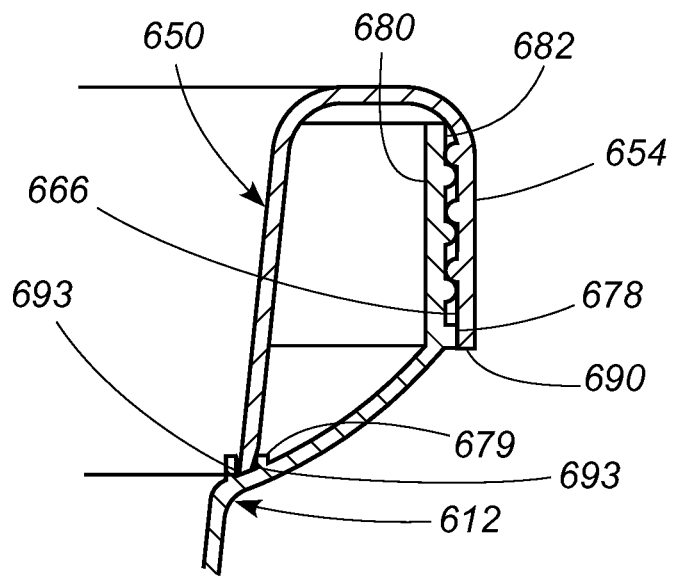
FIG. 27 is a partial cross section of the rim of FIG. 25 assembled onto the container of FIG. 26.

FIG. 27 shows the rim 650 assembled onto the upper end of the container 642. The grooves and flanges on the inner surface 666 of the outer rim wall 654 engage the cooperating grooves and flanges on the outer surface 682 of the vertical wall 680. As the rim 650 is advanced down over the upper end of the container 642, the beveled lower end 693 of the inner rim wall 656 confronts the tab 679 on upper surface 677 of the brim 676 and urges the lower end of the inner rim wall behind the tab. The inner rim wall 656 is thus captured behind the tab 679, preventing the inner rim wall from flexing outward. As a result the outer rim wall 654 is inhibited from flexing outward, maintaining the engagement between the grooves on the rim 650 and container 642.

Figure 28:
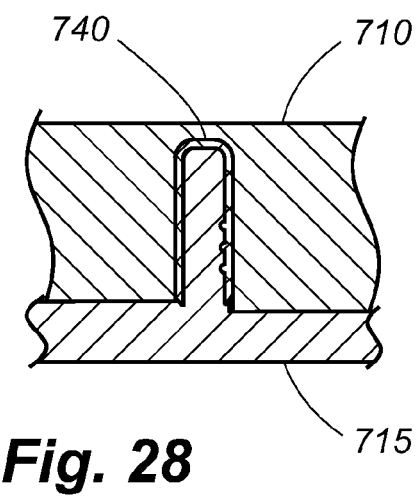
FIG. 28 is a cross-sectional schematic view of a mold cavity, a mold core, and a rim during the manufacturing process.
Figure 29:
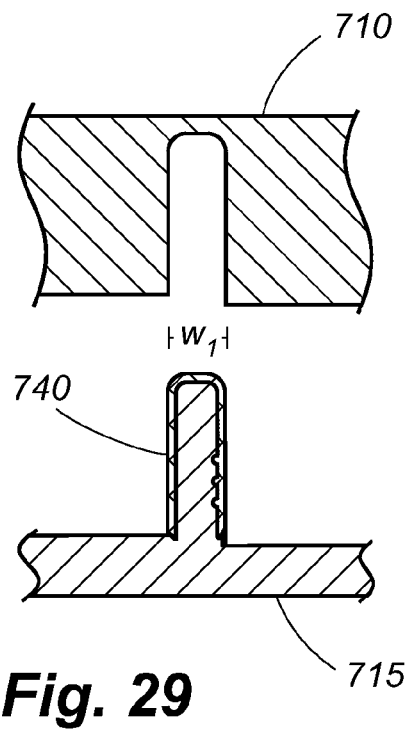
FIG. 29 is a cross-sectional schematic view of the mold cavity, mold core, and rim of FIG. 28 showing the mold cavity separated from the mold core and rim.
Figure 30:
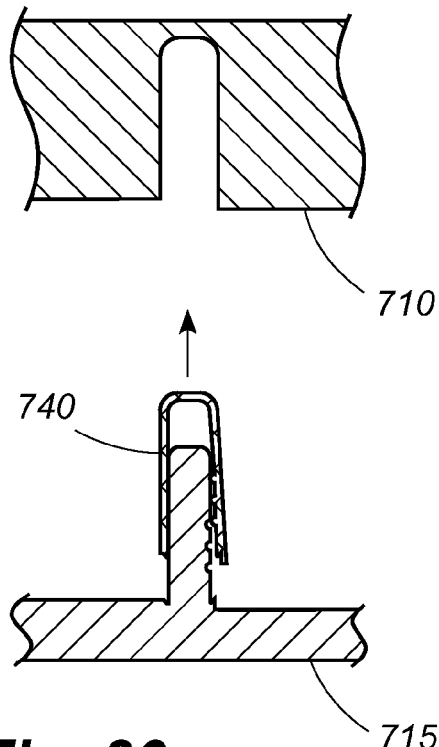
FIG. 30 is a cross-sectional schematic view of the mold cavity, mold core, and rim of FIG. 28 showing the rim in the process of being separated from the mold core.
Figure 31:
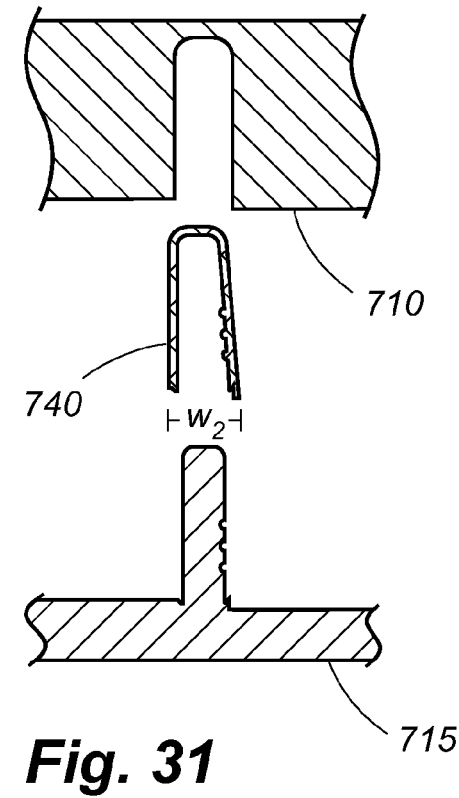
FIG. 31 is a cross-sectional schematic view of the mold cavity, mold core, and rim of FIG. 28 showing the rim fully separated from the mold core.

By way of describing a problem that a later-described embodiment addresses, FIGS. 28-31 schematically represent steps in the process of manufacturing a rim. As shown in FIG. 28, a mold cavity 710 and a mold core 715 define a space that is filled with molten plastic that, when cooled, forms a rim 750. In FIG. 29 the mold cavity 710 has been separated from the mold core 715, leaving the rim 750 on the core. As seen in FIG. 30, because of the grooves and flanges on the mold core 715 and the mutually facing inner wall of the rim 750, the legs of the rim are spread as the rim is forcibly ejected. As depicted in FIG. 31, it is possible that the legs may not return to their normal position after ejection. The width $w_2$ (FIG. 31) of the formed rim may thus be greater than the width $w_1$ (FIG. 28) of the rim when still in the mold.

FIGS. 32-38 illustrate another embodiment of a planter. A rim 750 is illustrated in FIGS. 32-34. The rim 750 has an outer wall 754 and an inner wall 756. Alternating grooves and flanges 764, 765 are formed on the inner surface 766 of the outer rim wall 754.

FIG. 33 depicts a lower end 790 of the outer rim wall 754. A skirt 791 extends as a continuation of the outer surface of the outer rim wall. Inward of the skirt 791 a stop 792 is formed. The stop 792 is angled from a low point adjacent the inner surface of the outer rim wall 794 to a high point adjacent the skirt 791.

Referring now to FIG. 34, the inner rim wall 756 has a lower end 793. A lip 794 is formed at the lower end 793 of the inner rim wall 756. Optionally the lip 794 is beveled. A stop 796 is formed by a horizontal wall where the lip 794 transitions into the major portion of the inner rim wall 756.

FIG. 35 shows the upper end of a container 742 upon which the rim 750 is adapted to be mounted. A generally horizontally extending annular brim 776 has an upper surface 777. A vertical wall 780 extends upward from the brim 776. The outer surface 782 of the vertical wall 780 has alternating grooves 784 and flanges 785 formed on it. A recess 798 is formed in the upper surface 777 of the brim 776.

FIG. 36 shows an enlarged view of the section of the container 742 where the vertical wall 780 meets the brim 776. The brim 776 has an outer peripheral edge 778. The recess 779 is formed in the upper surface 777 of the brim 776 adjacent the edge 778. The base of the recess 779 is angled from a high point adjacent the edge 778 to a low point spaced inward from the edge.

The rim 750 is assembled onto the upper end of the container 742 in FIG. 37. The cooperating grooves 764 and flanges 765 on the inner surface 766 of the outer rim wall 754 engage the cooperating grooves and flanges on the outer surface 782 of the vertical container wall 780. As shown in FIG. 38, the lip 794 at the lower end of the inner rim wall 756 engages the recess 798 in the upper surface 777 of the brim 776. The stop 796 at the lower end 793 of the inner rim wall 756 confronts the upper surface 777 of the brim 776 to prevent the rim from further advancement. The skirt 791 at the lower end 790 of the outer rim wall 754 extends downward over the outer peripheral edge 778 of the brim 776 to provide a seamless appearance. The angled stop 792 at the lower end of the outer rim wall 754 engages the angled recess 779 of the brim 776.

The angled orientation of the recess 779 and stop 792 not only restrains further downward advancement of the outer rim wall 754 but also biases the lower end 790 of the outer rim wall 754 inward and prevents the lower end of the outer rim wall from separating outward from the vertical container wall 780. This interaction in turn prevents the cooperating flanges and grooves on the container wall 780 and inner surface of the outer rim wall 754 from becoming disengaged. This arrangement can be advantageous in the instance of a rim whose walls have become spread as the result of forcible ejection from the mold, as explained above with respect to FIGS. 28-31.

Figure 39:
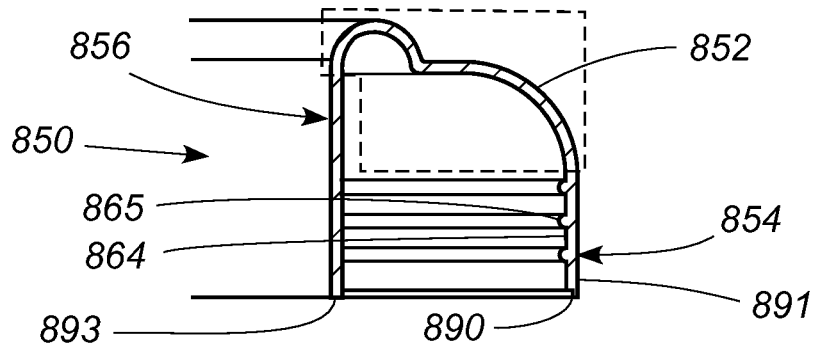
FIG. 39 is a cross section of a rim of still another embodiment of a planter.
Figure 40:
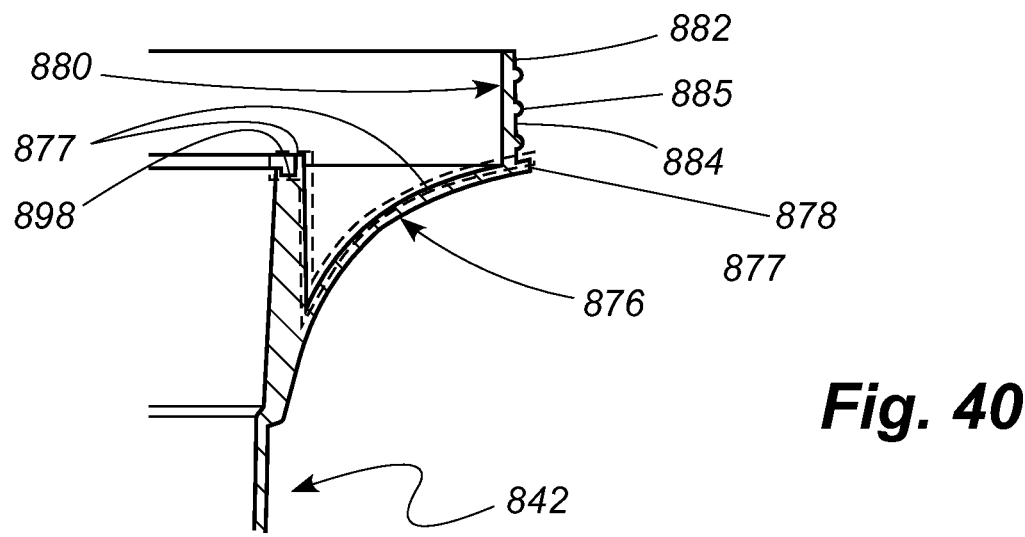
FIG. 40 is a partial cross section of the upper end of a container configured to couple with the rim of FIG. 39.
Figure 41:
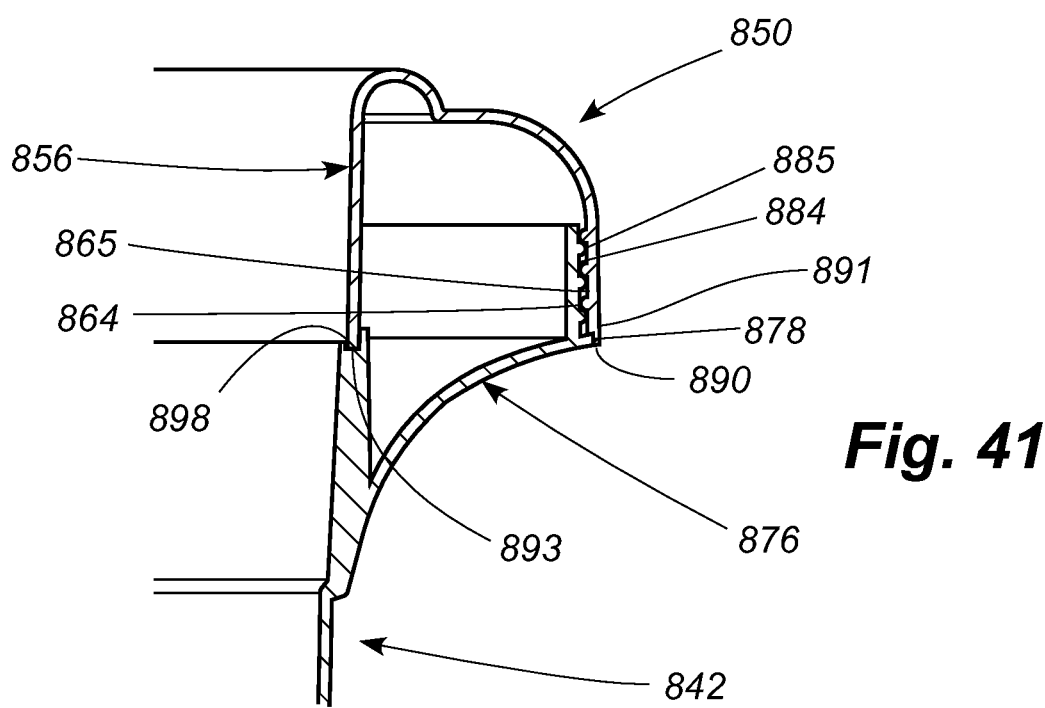
FIG. 41 is a cross section of the assembled rim of FIG. 39 and container upper end of FIG. 40.

Referring now to FIGS. 39-41, another alternate design of a rim and container is shown. As seen in FIG. 39, a rim 850 has an upper wall 852 indicated generally by the dashed lines. The rim 850 further has an outer wall 854 and an inner wall 856. Alternating grooves 864 and flanges 865 are formed on the inner surface 866 of the outer rim wall 854. The outer rim wall 854 has a lower end 890, and the inner rim wall 856 has a lower end 894.

FIG. 40 depicts the upper end of a container 842. The container has a brim 876 having an upper surface 877 (indicated generally by the dashed lines) and an outer end 878. An upper vertical wall 880 extends upward from the brim 876 at a location proximate its outer end 878. The outer surface 882 of the wall 880 has grooves 884 and flanges 885 that form discrete, parallel channels. A groove 898 is formed in the upper surface 877 of the container brim 876.

With reference to FIG. 41, the rim 850 is shown attached to the upper end of the container 842. The lower end 893 of the inner rim wall 856 engages the channel 898 in the upper surface of the brim 876. The lower end 890 of the outer rim wall conceals the outer peripheral edge 878 of the brim 876. The grooves 884 and flanges 885 on the container engage the grooves 864 and flanges 865 on the rim to fasten the rim securely to the top of the container.

Figure 42:
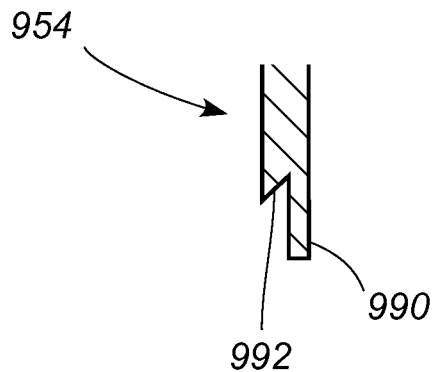
FIG. 42 is a cross section of the lower portion of an outer rim wall of yet another embodiment of a planter.
Figure 43:
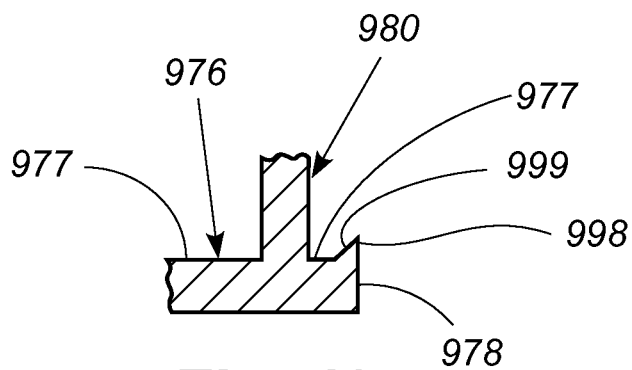
FIG. 43 is a cross section of a portion of the outer end of a container brim configured to engage the outer rim wall of FIG. 42.
Figure 44:
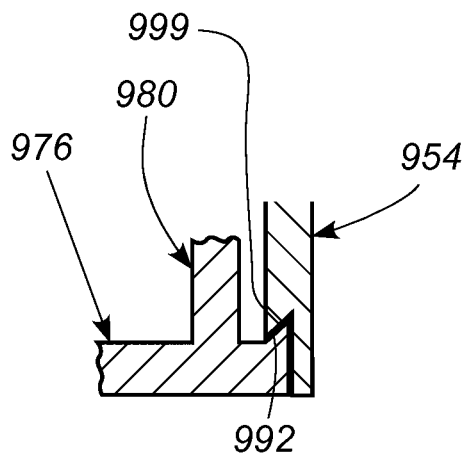
FIG. 44 is a cross section of the rim of FIG. 42 engaged with the container upper end of FIG. 43.

FIGS. 42-44 are a variation on the embodiment disclosed in FIGS. 22-28. Rather than the brim having a recess adjacent its periphery, a lip 998 extends upward from the upper surface 977 of the brim 976. The lip 998 has a beveled inner surface 999. A beveled stop 992 is formed adjacent the lower end of the outer brim wall 990. The stop 992 of the rim and the and beveled inner surface 999 of the lip 998 confront one another as the rim is placed onto the top of a container. The cooperating bevels bias the lower end of the outer rim wall 954 inward and constrain it against becoming laterally disengaged.

The following paragraphs discuss alternate embodiments with respect to reference numerals of the first embodiment 40. However, it will be understood that these alternate designs are equally applicable to the other disclosed embodiments.

Some of the foregoing embodiments have grooves 64 and flanges 84 in the form of helical threads. The rims 50 of these embodiments can be screwed onto the upper end of the container 42. Other embodiments have grooves 64 and flanges 84 that form discrete, parallel channels. The rims of these embodiments are simply forced down over the upper vertical wall of the container. The vertical wall 80 of the container 42, the outer rim wall 54, or both are sufficiently compliant that one or both of the walls 54, 80 will yield sufficiently to permit the flanges 84 of the rim 50 to snap past the grooves 64 on the container 42 until the lower ends of the rim walls 54, 56 abut the brim 76 at the upper end of the container.

Even in those embodiments that have helical threads, it may be advantageous for assembly purposes to simply force the rim 50 down over the upper end of the container 42, at least part way if not all the way, rather than screw the rim onto the upper end of the container. Again, the walls 54, 80 will yield sufficiently to permit the flanges 84 of the rim 50 to snap past the grooves 64 on the container 42. The rim 50 in the helical thread embodiments can be advanced until the lower ends of the rim walls 54, 56 abut the brim 76 at the upper end of the container 42, or it can be forced part way and screwed on the rest of the way to ensure a tight engagement.

It will be appreciated that all of the foregoing embodiments can be provided either with helical threads or with discrete grooves.

It will also be understood that the grooves 64 can be located on the outer surface 81 of the vertical container wall 80, instead of on the rim 50, and that the flanges 84 can be located on the inner surface 66 of the outer rim wall 56, instead of on the container.

Similarly, other features disclosed with respect to only certain of the above-described embodiments can be provided on other embodiments. For example, the feature of the lower end of the outer rim wall comprising both a skirt and a stop can be added to any embodiment. As another example, the feature of the lower end of the outer rim wall and the stop surface on the upper surface of the container brim being beveled to draw the outer rim wall inward can be added to other embodiments. Still other examples will occur to a person of ordinary skill in the art. Further, the shape of the upper rim wall can be modified so long as the basic concept of spaced-apart inner and outer rim walls is maintained.

Finally, it will be understood that the preferred embodiment has been disclosed by way of example, and that other modifications may occur to those skilled in the art without departing from the scope and spirit of the appended claims.

What is claimed is:

1. A planter comprising:
a concave container formed from a thermoplastic material, the container having an upper end;
a brim extending outward from an upper portion of the container adjacent the upper end, the brim having an upper surface; a vertical wall extending upward from the brim and having an outwardly facing surface;
a rim formed from a thermoplastic material, the rim having a top wall with inner and outer edges;
an outer rim wall extending downward from the outer edge of the top rim wall and having an inwardly facing surface;
an inner rim wall extending downward from the inner edge of the top rim wall;
a flange formed on one of the outwardly facing surface of the vertical wall of the container and the inwardly facing surface of the outer rim wall; a groove formed on the other of the outwardly facing surface of the vertical wall of the container and the inwardly facing surface of the outer rim wall;
wherein when the rim is assembled onto the upper end of the container, the outwardly facing surface of the vertical wall of the container and the inwardly facing surface of the outer rim wall are in mutually facing relation such that the flange on the one of the outwardly facing surface of the vertical wall of the container and the inwardly facing surface of the outer rim wall cooperatively engages the groove on the other of the outwardly facing surface of the vertical wall of the container and the inwardly facing surface of the outer rim wall to retain the rim on the upper end of the container; and
an inner stop formed on a lower portion of the inner rim wall and configured such that when the rim is assembled onto the upper end of the container, the inner stop confronts the upper surface of the brim to limit the extent to which the rim can be advanced onto the upper end of the container.

2. The planter of claim 1:
wherein a lower end of the inner rim wall has a portion of reduced cross section;
wherein a transition is formed at a junction between the portion of reduced cross section and a major portion of the inner rim wall; and
wherein the transition comprises the inner stop.

3. A planter comprising:
a concave container formed from a thermoplastic material, the container having an upper end;
a brim extending outward from an upper portion of the container adjacent the upper end, the brim having an upper surface; a vertical wall extending upward from the brim and having an outwardly facing surface;
a rim formed from a thermoplastic material, the rim having a top wall with inner and outer edges;
an outer rim wall extending downward from the outer edge of the top rim wall and having an inwardly facing surface;
an inner rim wall extending downward from the inner edge of the top rim wall;
a flange formed on one of the outwardly facing surface of the vertical wall of the container and the inwardly facing surface of the outer rim wall; a groove formed on the other of the outwardly facing surface of the vertical wall of the container and the inwardly facing surface of the outer rim wall;
wherein when the rim is assembled onto the upper end of the container, the outwardly facing surface of the vertical wall of the container and the inwardly facing surface of the outer rim wall are in mutually facing relation such that the flange on the one of the outwardly facing surface of the vertical wall of the container and the inwardly facing surface of the outer rim wall cooperatively engages the groove on the other of the outwardly facing surface of the vertical wall of the container and the inwardly facing surface of the outer rim wall to retain the rim on the upper end of the container; and
an outer stop formed on a lower portion of the outer rim wall and configured such that when the rim is assembled onto the upper end of the container, the outer stop confronts the upper surface of the brim to limit the extent to which the rim can be advanced onto the upper end of the container.

4. The planter of claim 3:
wherein an outer portion of a lower end of the outer rim wall has a reduced cross section in comparison to a major portion of the outer rim wall;
wherein a transition is formed between the major portion of the outer rim wall portion and the portion of reduced cross section; and
wherein the transition comprises the outer stop.

5. The planter of claim 4, wherein when the rim is assembled onto the upper end of the container, a lower portion of the outer rim wall of reduced cross section extends downward over the outer edge of the upper end of the container.

6. The planter of claim 1, wherein the brim has an outer edge, and wherein the rim is configured such that when the rim is assembled onto the upper end of the container, a lower portion of the outer rim wall extends downward over the outer edge of the upper end of the container.

* * * * *

UNITED STATES PATENT AND TRADEMARK OFFICE
CERTIFICATE OF CORRECTION

PATENT NO. : 8,667,735 B2  
APPLICATION NO. : 13/221500  
DATED : March 11, 2014  
INVENTOR(S) : Kenneth A. Harbaugh Page 1 of 1

It is certified that error appears in the above-identified patent and that said Letters Patent is hereby corrected as shown below:

In the Specification

Column 2, line 50, "FIG. 15 an" should read --FIG. 15 is an--.
Column 4, line 52, "98"" should read --78"--.
Column 4, line 56, "98"" should read --78"--.
Column 7, line 25, "750" should read --740--.
Column 7, line 26, "750" should read --740--.
Column 7, line 28, "750" should read --740--.
Column 8, line 52, "the and" should read --the--.

In the Claims

Column 9, line 57, "surface" should read --surfaces--.
Column 10, line 35, "surface" should read --surfaces--.

Signed and Sealed this
Eighth Day of September, 2015

Michelle K. Lee
*Director of the United States Patent and Trademark Office*